United States Patent
Loew

(10) Patent No.: US 7,903,303 B2
(45) Date of Patent: Mar. 8, 2011

(54) DEVICE FOR ADJUSTING COLOR VIDEO SIGNALS

(75) Inventor: Andreas Loew, Gross-Gerau (DE)

(73) Assignee: GVBB Holdings S.A.R.L., Luxembourg (LU)

( * ) Notice: Subject to any disclaimer, the term of this patent is extended or adjusted under 35 U.S.C. 154(b) by 1127 days.

(21) Appl. No.: 10/527,579

(22) PCT Filed: Aug. 21, 2003

(86) PCT No.: PCT/EP03/09260
§ 371 (c)(1),
(2), (4) Date: Mar. 11, 2005

(87) PCT Pub. No.: WO2004/030370
PCT Pub. Date: Apr. 8, 2004

(65) Prior Publication Data
US 2006/0072172 A1      Apr. 6, 2006

(30) Foreign Application Priority Data
Sep. 11, 2002   (DE) ................... 102 42 037

(51) Int. Cl.
| | |
|---|---|
| *G03F 3/08* | (2006.01) |
| *H04N 9/68* | (2006.01) |
| *H04N 9/64* | (2006.01) |
| *G09G 5/02* | (2006.01) |
| *G09G 5/00* | (2006.01) |
| *G09G 1/06* | (2006.01) |
| *G06K 9/00* | (2006.01) |

(52) U.S. Cl. ......... 358/518; 348/645; 348/703; 345/597; 345/643; 345/12; 382/162

(58) Field of Classification Search .................. None
See application file for complete search history.

(56) References Cited

U.S. PATENT DOCUMENTS

| | | | |
|---|---|---|---|
| 4,418,358 A | 11/1983 | Poetsch | |
| 4,962,418 A * | 10/1990 | Kamaga | 348/658 |
| 5,001,663 A | 3/1991 | Parulski et al. | |
| 5,406,325 A | 4/1995 | Parulski | |
| 5,596,427 A * | 1/1997 | Honma et al. | 358/515 |
| 5,668,596 A * | 9/1997 | Vogel | 348/222.1 |
| 5,943,143 A | 8/1999 | Kawai et al. | |
| 6,337,692 B1 * | 1/2002 | Rai et al. | 345/594 |
| 6,433,898 B1 * | 8/2002 | Bestmann | 358/518 |
| 6,477,271 B1 * | 11/2002 | Cooper et al. | 382/167 |
| 6,563,531 B1 | 5/2003 | Matama | |
| 2001/0008428 A1 * | 7/2001 | Oh | 348/649 |
| 2002/0110376 A1 * | 8/2002 | MacLean et al. | 396/429 |

FOREIGN PATENT DOCUMENTS

| | | |
|---|---|---|
| GB | 2191360 | 12/1987 |
| JP | 11-136533 A | 5/1999 |
| JP | 2000-101766 | 4/2000 |

OTHER PUBLICATIONS

Search Report Dated Nov. 21, 2003.

* cited by examiner

*Primary Examiner* — Twyler L Haskins
*Assistant Examiner* — Barbara D Reinier
(74) *Attorney, Agent, or Firm* — Arent Fox LLP

(57) ABSTRACT

A device for adjusting color video signals, and in particular the color video signals produced by a film analyzer comprises a matrix for processing the color video signals to regulate the components of three basic colors into color video signals passing through the matrix. A controller controls the matrix with respect to hues which correspond to the color video signals, respectively.

2 Claims, 2 Drawing Sheets

DEVICE FOR ADJUSTING COLOR VIDEO SIGNALS

This application claims the benefit, under 35 U.S.C. §365 of International Application PCT/EP2003/009260, filed Aug. 21, 2003, which was published in accordance with PCT Article 21(2) on Apr. 8, 2004 in German and which claims the benefit of German patent application No. 10242037.8, filed Sep. 11, 2002.

TECHNICAL FIELD

The invention relates to an arrangement for correcting colour video signals, in particular colour video signals generated by a film scanner, with a matrix, through which the colour video signals pass and which can be used to control the proportions of three primary colours in matrixed colour value signals, provision being made of means for controlling the matrix in a manner dependent on the hue which the colour video signals respectively represent.

BACKGROUND OF THE INVENTION

When generating colour video signals from optical originals, for example when scanning films, colour errors occur, inter alia, by virtue of the fact that the filter curves during colour splitting do not correspond to the ideal curves. These errors can largely be corrected by matrixing the colour value signals. In this case, the coefficients of the matrix are set manually whilst observing the reproduced image.

The remaining, generally slight colour corruptions are conspicuous, however, particularly when the same original is scanned by two different recording apparatuses, particularly when the same film is reproduced by two different film scanners.

U.S. Pat. No. 5,668,596 discloses an arrangement for correcting colour video signals generated by an image sensor. In the known arrangement, provision is made of means for controlling a matrix in a manner dependent on the image sensor. Coefficients that serve for setting the matrix in a manner dependent on the image sensor are stored in a memory. The hue respectively represented by the colour video signals depends on the image sensor.

SUMMARY OF THE INVENTION

The arrangement according to the invention is characterized in that provision is made of means for reducing the effect of the correction in the case of low colour saturation. The arrangement according to the invention enables such a precise correction of the colour video signals that the same film produces an identical colour impression when scanned by different apparatuses. In this way, noise influences and exaggerated corrections of pixels with low colour saturation are furthermore avoided.

An advantageous refinement of the arrangement according to the invention consists in the fact that provision is made of memories for storing coefficients of the matrix or correction values for the coefficients of the matrix that are set previously in a manner dependent on the hue.

A further advantageous refinement of the arrangement according to the invention consists in the fact that a converter for generating a hue signal from the colour video signals is connected by its output to address inputs of memories for a respective correction value to be fed to the matrix. In this case, a reduction of the effect of the control in the case of low colour saturation may be achieved by virtue of the fact that the converter has a further output, which carries a colour saturation signal and is connected to multipliers located in the supply lines of the correction values to the matrix. The colour video signals are generally present as colour value signals, for which purpose, in the case of the arrangement according to the invention, it may be provided that the converter comprises a converter matrix for generating colour difference signals and a coordinate converter.

The colour video signals are generally present as colour value signals, for which purpose, in the case of the arrangement according to the invention, it may be provided that the converter comprises a converter matrix for generating colour difference signals and a coordinate converter.

Another advantageous refinement of the arrangement according to the invention consists in the fact that the matrix comprises nine further multipliers and three adders, in each case three further multipliers being connected to inputs of an adder and having three colour video signals—fed as colour value signals—applied to them, and in that a correction value/coefficient can be fed to a respective one of the further multipliers from one of the memories.

For setting the corrections, it is preferably provided that the correction values can be loaded into the memories from a computer, and in that the computer has a program for setting the coefficients. The computer may be provided with corresponding input devices, for example rotary regulators, which facilitate a selection of the hue that is respectively to be corrected and the setting of the magnitude and direction of the correction.

This development may be embodied in such a way that provision is made of a manual setting and/or an automatic determination of the correction values by scanning of a test film and comparison of the scanned values with desired values.

In another development, it is possible to take account of the non-linear film density by virtue of the fact that logarithmizers are connected upstream of the matrix and delogarithmizers are connected downstream of the matrix.

BRIEF DESCRIPTION OF THE DRAWING

An exemplary embodiment of the invention is illustrated in the drawing on the basis of a plurality of figures and is explained in more detail in the description below. In the figures.

DESCRIPTION OF THE EXEMPLARY EMBODIMENT

Figure 1:
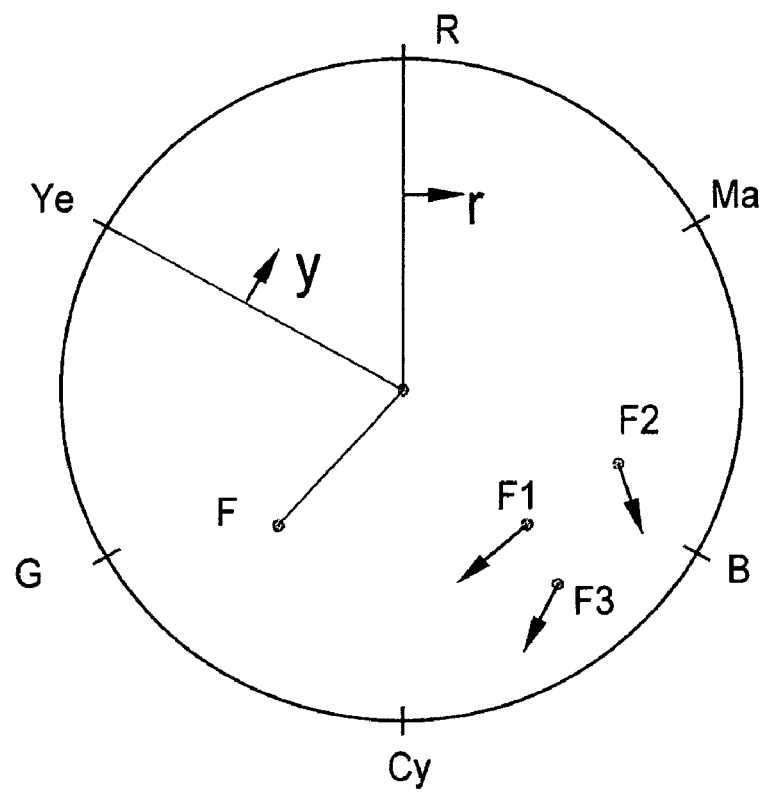
FIG. 1 schematically shows a chromatic circle.

In the case of the representation of colours that is known per se in accordance with FIG. 1, each colour F can be represented by a vector whose magnitude corresponds to the colour saturation and whose angle corresponds to the hue. The chromatic circle contains all colours that can be represented, in particular the primary colours R, G, B and the intermediate colours Ye, Ma and Cy (yellow, magenta, cyan). The arrangement according to the invention can set and carry out a correction for each hue, which is represented for example by two arrows r and y in FIG. 1. This correction can be carried out with the aid of the arrangement illustrated in FIG. 2. If the colour saturation is furthermore taken into account during the correction, then it is also possible to set different corrections for different saturation values, which is symbolized in FIG. 1 on the basis of the colours F1 to F3 and the arrows representing the correction.

Figure 2:
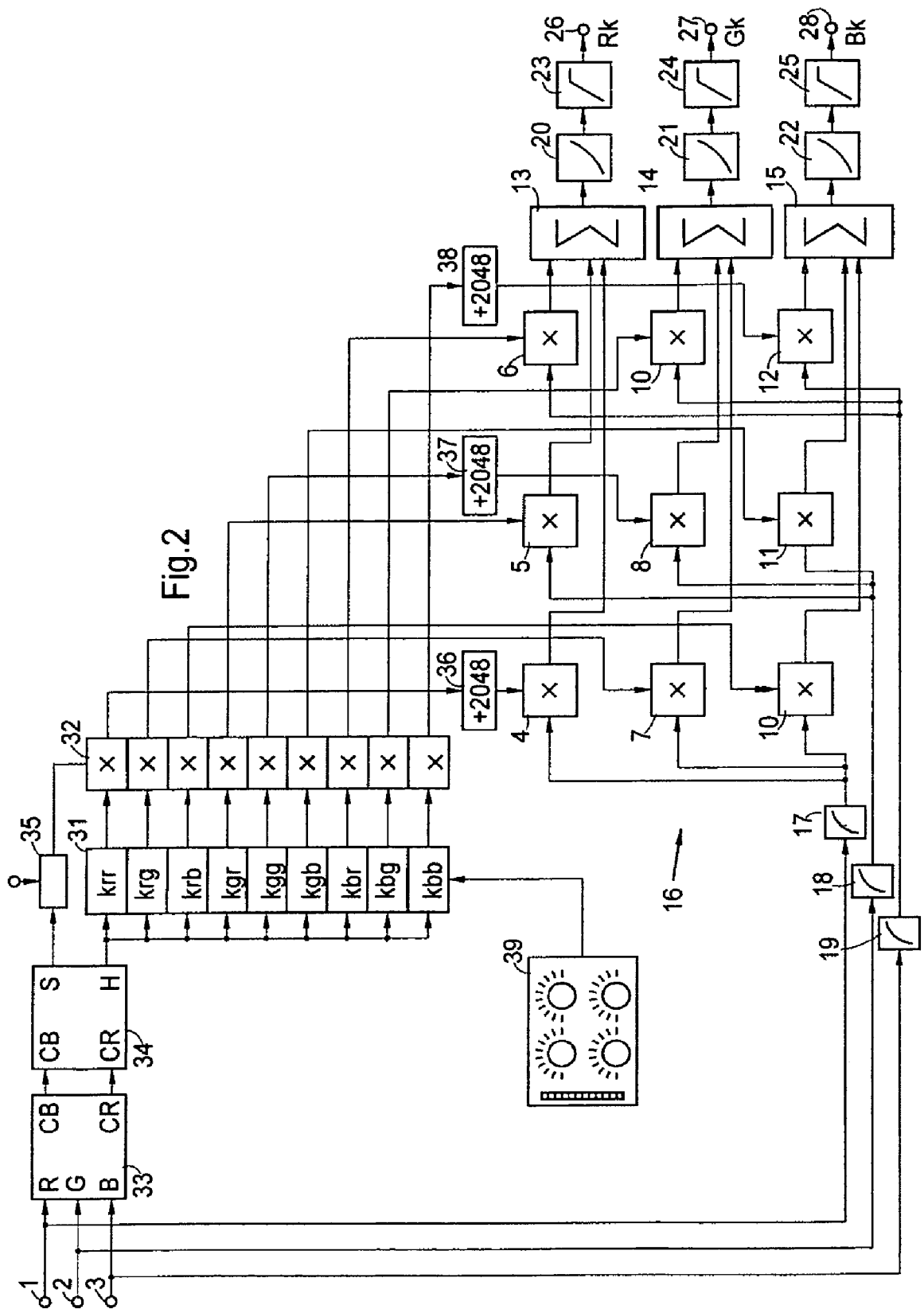
FIG. 2 shows a block diagram of an arrangement according to the invention.

Colour value signals R, G, B are fed to the arrangement according to FIG. 2 via inputs 1, 2, 3. The correction is effected in a matrix comprising multipliers 4 to 12 and adders 13, 14, 15. For adaptation to the non-linear profile of the film density, logarithmizers 17, 18, 19 are connected upstream of the matrix 16 and delogarithmizers 20, 21, 22 are connected downstream of the matrix 16.

Since signals that are greater than the predetermined range of values of the digital video signals may arise during the correction, limiters 23, 24, 25 are furthermore connected downstream of the matrix 16 and limit the video signals to a maximum value governed by the respective quantization. The corrected colour value signals can be taken from outputs 26, 27, 28. The matrix 16 maps the following system of equations:

$$Rk=R.Krr+G.Kgr+B.Kbr$$

$$Gk=R.Krg+G.Kgg+B.Kbg$$

$$Bk=R.Krb+G.Kgb+B.Kbb$$

Correction values krr, krg, krb, kgr, kgg, kgb, kbr, kbg and kbb for the coefficients are stored in nine memories 31. The outputs of the memories 31 are connected via a respective one of the multipliers 32 to inputs of the multipliers 4 to 12 of the matrix 16.

In order that the correction values can be read from the memories 31 in a manner dependent on the hue, the colour value signals R, G, B are firstly converted into colour difference signals CB, CR in a converter matrix 33. The said colour difference signals are then converted from Cartesian coordinates into polar coordinates in a suitable converter 34. In this case, the angle represents the hue H and the magnitude represents the colour saturation S. The hue H is fed as a signal having a width of 12 bits to the address inputs of the memories 31. The colour saturation signal—likewise having a width of 12 bits—is forwarded via a switch 35 to the multipliers 32, with the result that the correction values read from the memories 31 are reduced in the case of low colour saturation.

The correction values read from the memories 31 have a width of 10 bits and can assume positive and negative values. The output signals of the multipliers 12 have a width of 12 bits, the sign being continued. The value 2048 is in each case added to the correction values krr, kgg and kbb after multiplication at 36, 37 and 38 for the purpose of forming the coefficients, while the remaining correction values serve directly as coefficients. This ensures that the matrix 16 is operated as a unit matrix if the correction values themselves are zero or are multiplied by zero. The colour value signals are then conducted unchanged through the matrix.

What is claimed is:

1. Apparatus for correcting color video signals, comprising:
    a matrix, through which the color video signals pass to control the proportions of three primary colors in matrixed color value signals,
    means for controlling the matrix as a function of hue of the color video signals respectively,
    means for controlling the matrix as a function of color saturation;
    memories for storing information which the matrix uses to control the color value signals;
    a converter for generating a hue signal from the color video signals, the hue signal connected to inputs of the memories;
    wherein the matrix comprises nine multipliers and three adders,
    wherein three of the nine multipliers are connected to one adder, respectively,
    wherein the memories store coefficients of the matrix that are set as a function of hue of the color video signals; and
    wherein the converter generates a color saturation signal from the color video signals, supplied to multipliers located in the supply lines of the correction values to the matrix.

2. Apparatus for correcting color video signals, comprising:
    a matrix through which the color video signals pass to control the proportions of three primary colors in matrixed color value signals,
    means for controlling the matrix as a function of hue of the color video signals respectively,
    means for controlling the matrix as a function of color saturation;
    memories for storing information which the matrix uses to control the color value signals;
    a converter for generating a hue signal from the color video signals, the hue signal connected to inputs of the memories;
    wherein the matrix comprises nine multipliers and three adders,
    wherein three of the nine multipliers are connected to one adder, respectively;
    wherein the memories store coefficients of the matrix that are set as a function of hue of the color video signals;
    wherein the memories store correction values for coefficients of the matrix, wherein the correction values are set as a function of hue of the color video signals; and
    wherein the converter generates a color saturation signal from the color video signals, supplied to multipliers located in the supply lines of the correction values to the matrix.

* * * * *